(12) United States Patent  (10) Patent No.: US 9,002,187 B1
Reiman et al.  (45) Date of Patent: Apr. 7, 2015

(54) HANDHELD SUBJECT FRAMING APPARATUS FOR PHOTOGRAPH

(71) Applicants: Patricia L Reiman, Romeoville, IL (US); Phillip R. Reiman, Romeoville, IL (US)

(72) Inventors: Patricia L Reiman, Romeoville, IL (US); Phillip R. Reiman, Romeoville, IL (US)

( * ) Notice: Subject to any disclaimer, the term of this patent is extended or adjusted under 35 U.S.C. 154(b) by 0 days.

(21) Appl. No.: 14/505,347

(22) Filed: Oct. 2, 2014

(51) Int. Cl.
 *G03B 15/00* (2006.01)

(52) U.S. Cl.
 CPC ...................................... *G03B 15/00* (2013.01)

(58) Field of Classification Search
 CPC ........ G03B 13/02; G03B 13/04; G03B 15/00; G03B 2213/02; G02B 23/14
 See application file for complete search history.

(56) References Cited

U.S. PATENT DOCUMENTS

| | | | | |
|---|---|---|---|---|
| 1,987,041 A | * | 1/1935 | Wood | 396/378 |
| 4,283,860 A | * | 8/1981 | Rucker | 33/277 |
| 4,343,534 A | * | 8/1982 | Gruskin | 359/894 |
| 4,616,912 A | * | 10/1986 | Johnsen | 396/5 |
| 7,033,088 B2 | * | 4/2006 | Figgis et al. | 396/420 |
| 2009/0238548 A1 | * | 9/2009 | Smith et al. | 396/5 |
| 2009/0315869 A1 | * | 12/2009 | Sugihara et al. | 345/204 |
| 2014/0098274 A1 | * | 4/2014 | Asakura et al. | 348/333.05 |

\* cited by examiner

*Primary Examiner* — W B Perkey
(74) *Attorney, Agent, or Firm* — Williams Intellectual Property; Benjamin F. Williams

(57) ABSTRACT

A handheld subject framing apparatus for photograph that includes a perimetric frame customizable by attachment of each of a plurality of decorative elements to a first surface thereof, said perimetric frame including at least a pair of handles disposed upon a second surface thereof, whereby at least one subject is enabled ready portage of said perimetric frame to position said perimetric frame, customized to commemorate a particular event, as case may be, in position to bound a field of view, within which field of view the at least one subject is photographable as bounded by said perimetric frame.

5 Claims, 4 Drawing Sheets

US 9,002,187 B1

HANDHELD SUBJECT FRAMING APPARATUS FOR PHOTOGRAPH

BACKGROUND OF THE INVENTION

Various types of framing apparatuses for photographs are known in the prior art. However, what is needed is a handheld subject framing apparatus for photograph that includes a perimetric frame customizable by attachment of each of a plurality of decorative elements to a first surface thereof, said perimetric frame including at least a pair of handles disposed upon a second surface thereof, whereby at least one subject is enabled ready portage of said perimetric frame to position said perimetric frame, customized to commemorate a particular event, as case may be, in position to bound a field of view, within which field of view the at least one subject is photographable as bounded by said perimetric frame.

FIELD OF THE INVENTION

The present invention relates to a handheld subject framing apparatus for photograph, and more particularly, to a handheld subject framing apparatus for photograph that includes a perimetric frame customizable by attachment of each of a plurality of decorative elements to a first surface thereof, said perimetric frame including at least a pair of handles disposed upon a second surface thereof, whereby at least one subject is enabled ready portage of said perimetric frame to position said perimetric frame, customized to commemorate a particular event, as case may be, in position to bound a field of view, within which field of view the at least one subject is photographable as bounded by said perimetric frame.

SUMMARY OF THE INVENTION

The general purpose of the handheld subject framing apparatus for photograph, described subsequently in greater detail, is to provide a handheld subject framing apparatus for photograph which has many novel features that result in a handheld subject framing apparatus for photograph which is not anticipated, rendered obvious, suggested, or even implied by prior art, either alone or in combination thereof.

The present handheld subject framing apparatus for photograph has been devised to enable at least one subject for photograph to hold a customizable and decorative perimetric frame surrounding a field of view in which the subject is capturable for photograph, whereby said perimetric frame is disposed bordering said subject in the resultant image.

The present handheld subject framing apparatus for photograph further includes an event specific plurality of decorative elements, each of said plurality of decorative elements disposed attachable to a first surface of the perimetric frame. The event specific plurality of decorative elements is contemplated to include letters, numbers, characters, clip-art, and other iconic and graphical imagery suited to the commemoration of a specific event, such as, for example, a wedding, a reunion, an anniversary, a graduation, a birthday, among other events suitably commemorated with use of the instant handheld subject framing apparatus for photograph.

A user may, therefore, customize the perimetric frame first surface with words and images, such as, for example, the date, an age, the name of a bride and groom, university, or other such identifying characteristic appropriate to commemorate the moment in a subsequent photograph. Moreover, a variety of frame surfaces—such as resemble, for example, antiqued wood, brass, metal, or another framing material—are contemplated as part of the plurality of decorative elements whereby the appearance of the perimetric frame first surface is customizable, as desired, to suit a particular occasion.

The present handheld subject framing apparatus for photograph, therefore, includes a perimetric frame disposed to bound a field of view. In the preferred embodiment herein illustrated, said perimetric frame is disposed as an oblong, however additional shapes are contemplated as part of this invention including, for example, an oval perimetric frame. The perimetric frame includes a first surface, dispositional to face a camera disposed to capture the field of view surrounded by said perimetric frame, and a second surface, disposed to afford purchase to a subject holding the perimetric frame in position requisite for the subsequent photograph.

A plurality of hook and loop fasteners is disposed upon the first surface whereby each of the plurality of decorative elements is attachable. At least a pair of handles is disposed upon the second surface for ready grasping by at least one subject whereby the perimetric frame is situational, as desired, in position surrounding a relevant field of view within which said subject supporting the perimetric frame is photographable as bounded by said perimetric frame. The at least a pair of handles further enables ready portage of the perimetric frame with a subject's hands concealed from view of a camera capturing a photograph of said subject bordered by the perimetric frame.

Thus has been broadly outlined the more important features of the present handheld subject framing apparatus for photograph so that the detailed description thereof that follows may be better understood and in order that the present contribution to the art may be better appreciated.

Objects of the present handheld subject framing apparatus for photograph, along with various novel features that characterize the invention are particularly pointed out in the claims forming a part of this disclosure. For better understanding of the handheld subject framing apparatus for photograph, its operating advantages and is specific objects attained by its uses, refer to the accompanying drawings and description.

BRIEF DESCRIPTION OF THE DRAWINGS

Figures

DETAILED DESCRIPTION OF THE DRAWINGS

Figure 1:
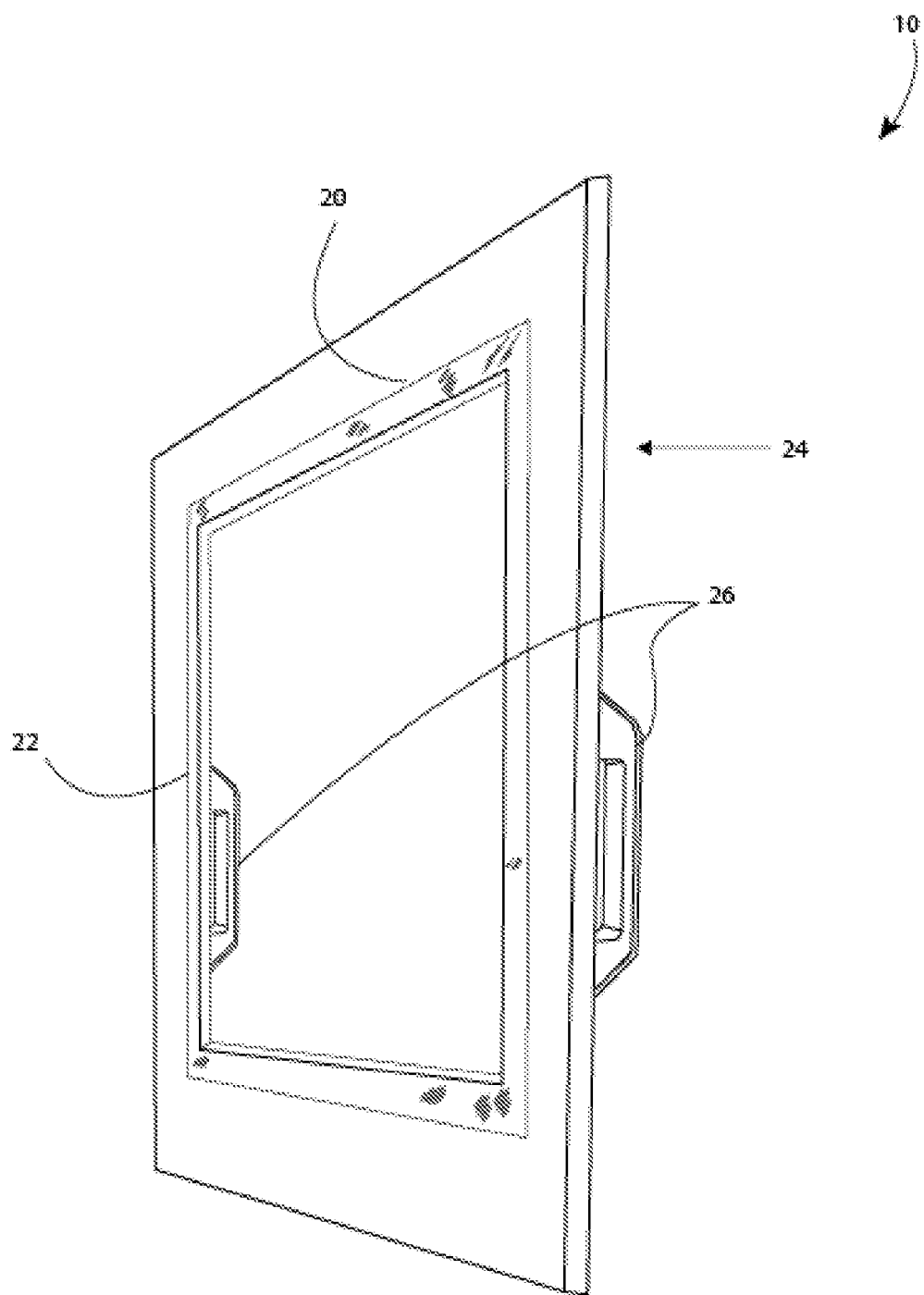
FIG. 1 is an isometric view of an example embodiment.
Figure 2:
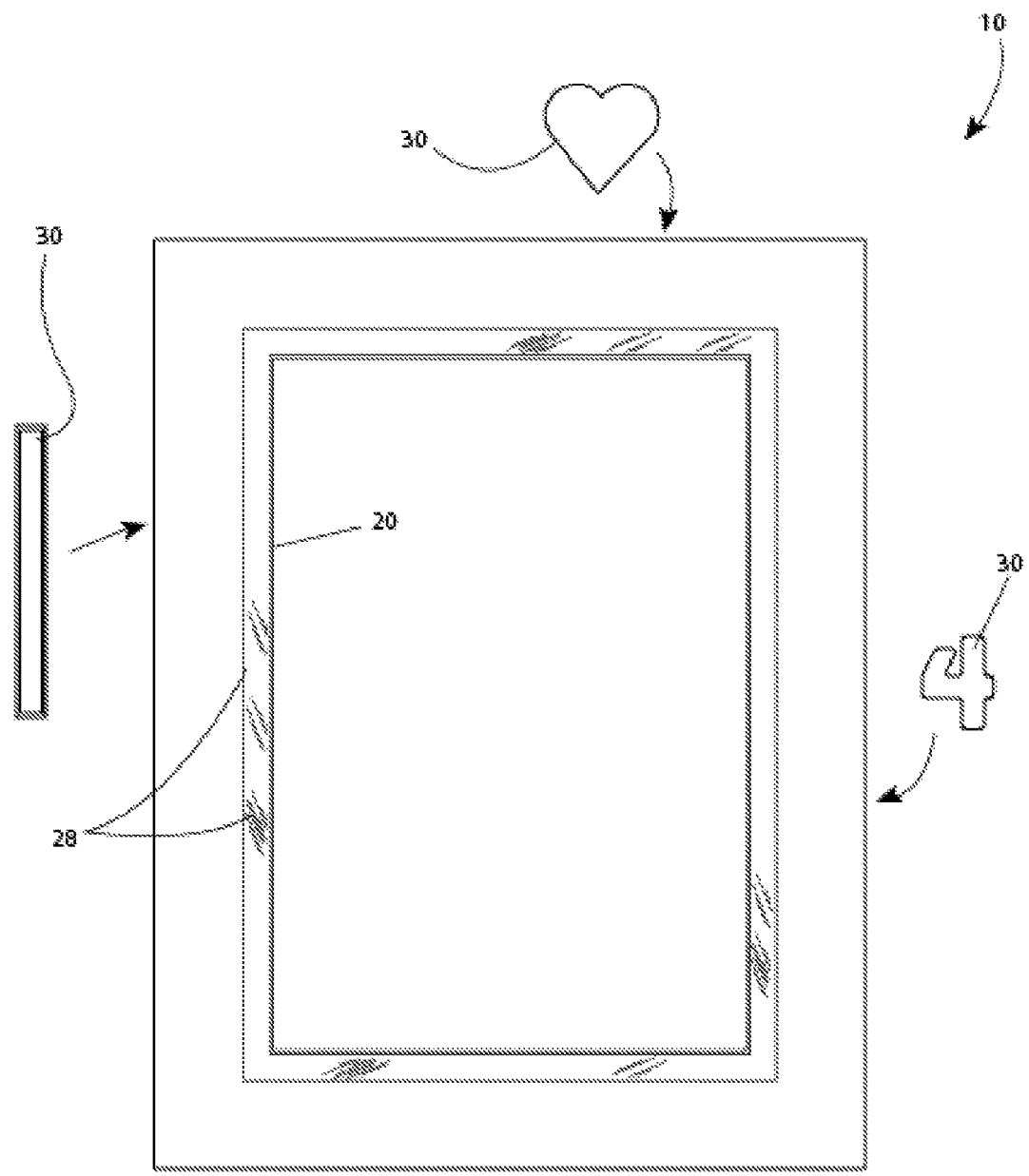
FIG. 2 is a front view of an example embodiment illustrating attachment of a plurality of decorative elements.
Figure 3:
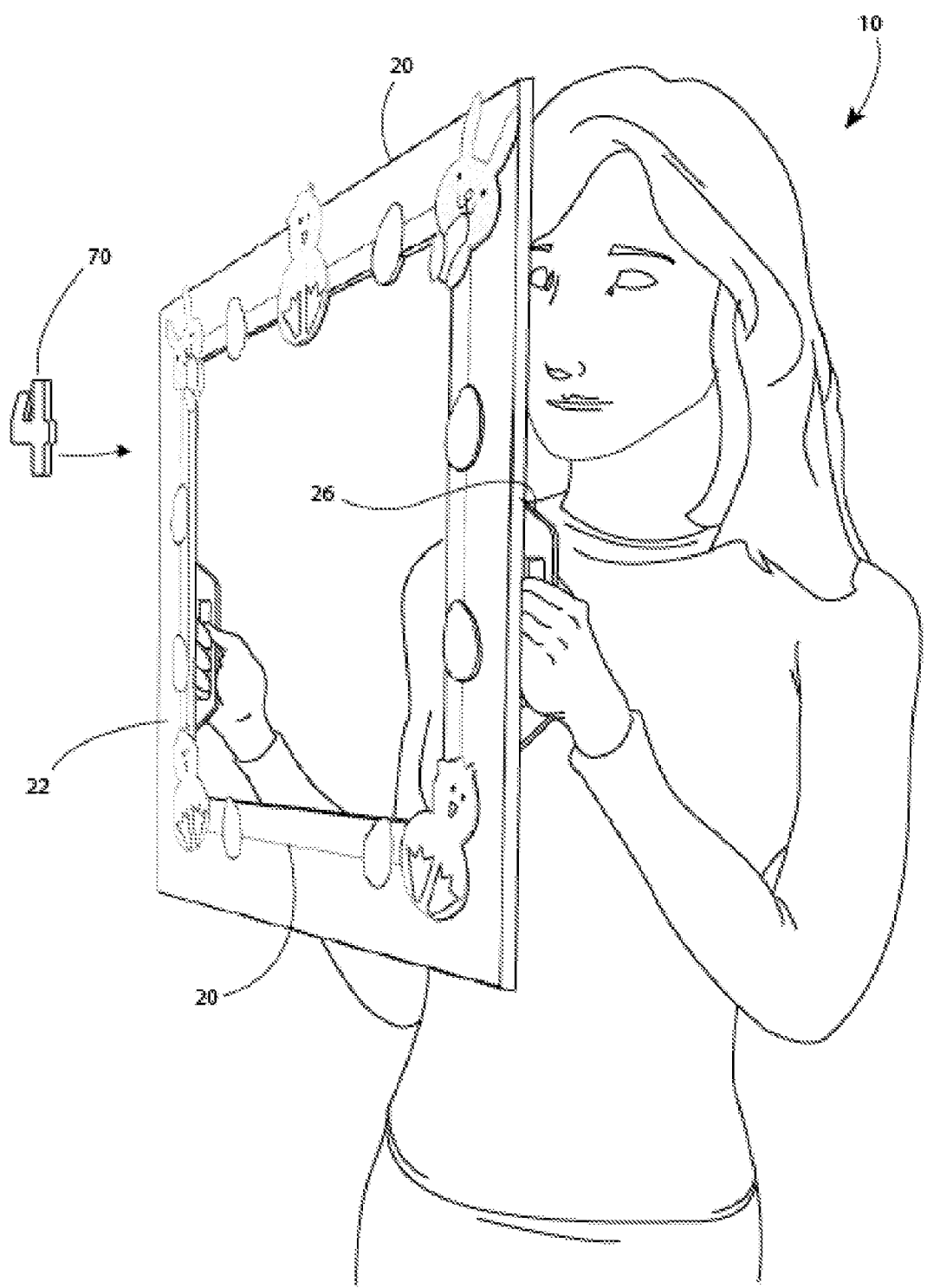
FIG. 3 is an in-use view of an example embodiment illustrating at least one subject porting a perimetric frame for capture of a photograph with said perimetric frame disposed bounding the field of view.
Figure 4:
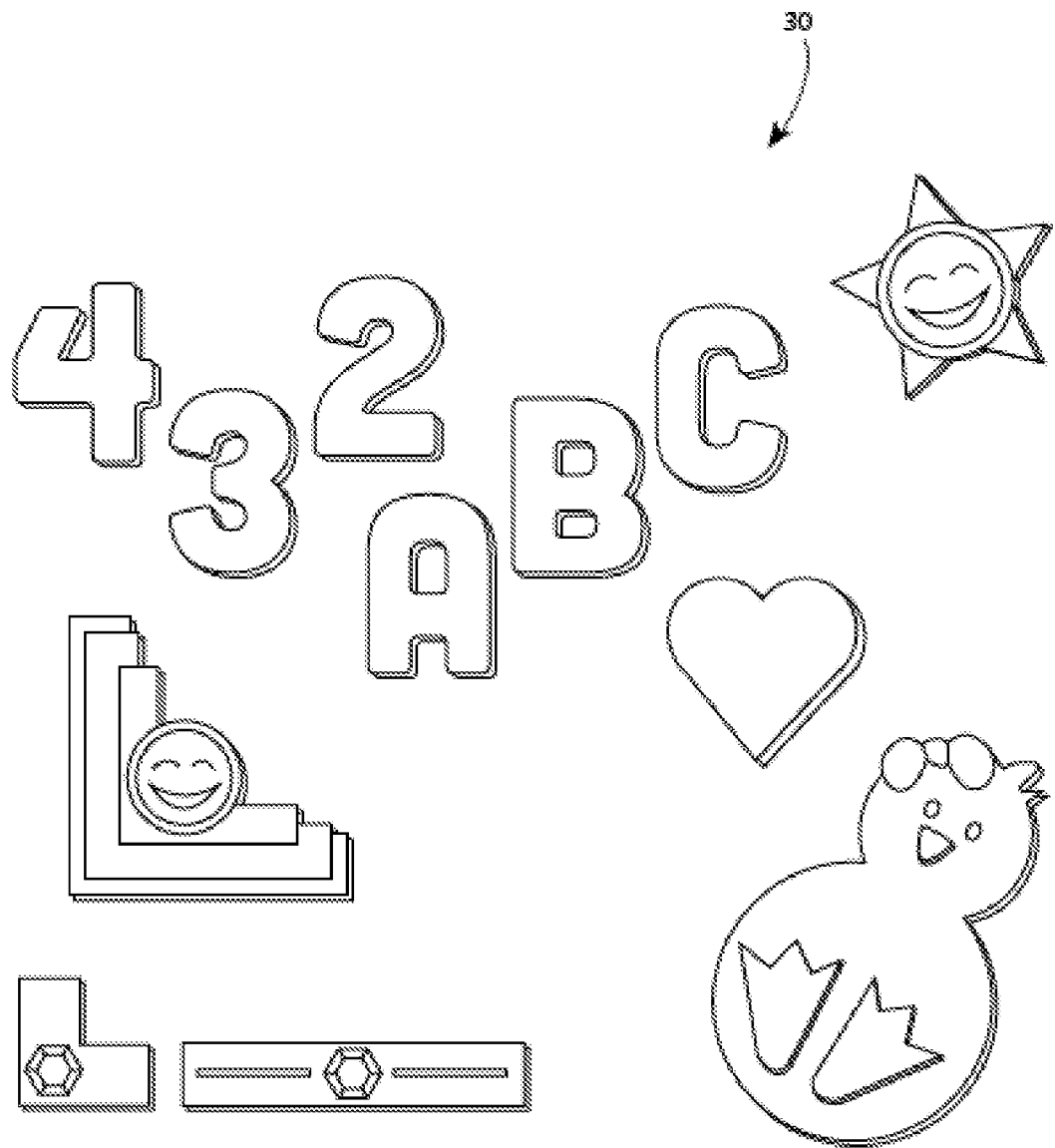
FIG. 4 is an elevated view of a plurality of decorative elements disposed for attachment to the first surface of the perimetric frame, including letters, numbers, graphical images, and frame materials.

With reference now to the drawings, and in particular FIGS. 1 through 4 thereof, example of the instant handheld subject framing apparatus for photograph employing the principles and concepts of the present handheld subject framing apparatus for photograph and generally designated by the reference number 10 will be described.

Referring to FIGS. 1 through 4 a preferred embodiment of the present handheld subject framing apparatus for photograph 10 is illustrated.

The present handheld subject framing apparatus for photograph 10 has been devised to enable a perimetric frame 20 positional surrounding a field of view to be captured by a photograph, wherein at least one subject holding the perimetric frame 20 is thereby photographable interior to said perimetric frame 20 with said perimetric frame 20 situational to bound the extremities of the captured field of view.

The perimetric frame 20 includes a plurality of event specific decorative elements 30 disposed attachable to a first surface 22 of said perimetric frame 20, whereby events such as weddings, birthdays, anniversaries, graduations, among other noteworthy occasions, are commemorative with photographs of people holding the perimetric frame 20, customized to celebrate the particular event, bounding a captured field of view of a photograph.

The present handheld subject framing apparatus for photograph 10, therefore, includes a perimetric frame 20 dispositional around an open field of view. A first surface 22 is disposed upon the perimetric frame 20 to face a camera 70 capturing said field of view and a second surface 24 is disposed upon the perimetric frame 20 to face at least one subject holding said perimetric frame 20 in position.

To enable ease of portage and situation of the perimetric frame 20 during photographing, while hiding a subject's hands from view of the camera, at least a pair of handles 26 disposed upon the second surface 24 of the perimetric frame 20. The at least a pair of handles 26 is graspable by at least one subject standing behind the frame 20 to position said frame 20 surrounding a field of view wherein is capturable said at least one subject by photograph.

A plurality of hook and loop fasteners 28 is disposed upon the first surface 22 for selective attachment of an event specific plurality of decorative elements 30 thereto. The event specific plurality of decorative elements 30 is thereby dispositional to customize the first surface 22 suitable to capture of a photograph of at least one subject standing behind the perimetric frame 20 commemorative of a particular event. The plurality of decorative elements 30 is taken to include letters, numbers, graphical images, icons, glyphs, materials reminiscent of frame materials (such as wood, metal, or other material used in framing), decorative frame boundaries (such as are seen around pictures of particular epochs, eras, and artistic styles), moldings, among other such decorative elements.

The present handheld subject framing apparatus for photograph 10, therefore, is graspable and situational to present the perimetric frame 20 surrounding a field of view bordering at least one subject, when said at least one subject stands behind and grasps the perimetric frame 20 at each of the at least a pair of handles 26 appropriate to frame a field of view for a photograph captured with said at least one subject in the midst thereof, whereby commemorative photographs are acquisitional of at least one subject framed at a particular event and the perimetric frame 20 first surface 22 is decorative and customizable to commemorate said particular event, as desired.

What is claimed is:

1. A handheld subject framing apparatus for photograph comprising:
    a perimetric frame disposed around an open field of view;
    a first surface;
    a second surface;
    at least a pair of handles disposed upon the second surface, said at least a pair of handles graspable by at least one subject standing behind the frame to position the frame surrounding a filed of view containing said at least one subject;
    a plurality of hook and loop fasteners disposed upon the first surface; and
    an event specific plurality of decorative elements attachable to each of the plurality hook and loop fasteners, said event specific plurality of decorative elements thereby dispositional to customize the first surface suitable to capture of a photograph of at least one subject standing behind the perimetric frame commemorative of a particular event;
    wherein the perimetric frame is graspable and situational to surround a field of view bordering at least one subject, said at least one subject standing behind and grasping the perimetric frame at each of the at least a pair of handles appropriate to frame a field of view for a photograph captured with said at least one subject in the midst thereof, whereby commemorative photographs are acquisitional of at least one subject framed at a particular event and the perimetric frame first surface is decorative and customizable to commemorate said particular event.

2. The handheld subject framing apparatus for photograph of claim 1 wherein the event specific plurality of decorative elements comprises letters, numbers, glyphs, logos, designs, graphics, icons, and pictorial elements suited for showcasing a wedding.

3. The handheld subject framing apparatus for photograph of claim 1 wherein the event specific plurality of decorative elements comprises letters, numbers, glyphs, logos, designs, graphics, icons, materials, and pictorial elements suited for showcasing a birthday.

4. The handheld subject framing apparatus for photograph of claim 1 wherein the event specific plurality of decorative elements comprises letters, numbers, glyphs, logos, designs, graphics, icons, materials, and pictorial elements suited for showcasing an anniversary.

5. The handheld subject framing apparatus for photograph of claim 1 wherein the event specific plurality of decorative elements comprises letters, numbers, glyphs, logos, designs, graphics, icons, materials, and pictorial elements suited for showcasing a graduation.

* * * * *